US006681568B2

(12) United States Patent

Smith

(10) Patent No.: US 6,681,568 B2

(45) Date of Patent: Jan. 27, 2004

(54) FLUID SYSTEM FOR TWO HYDRAULIC CIRCUITS HAVING A COMMON SOURCE OF PRESSURIZED FLUID

(75) Inventor: David P. Smith, Joliet, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/109,484

(22) Filed: Mar. 28, 2002

(65) Prior Publication Data

US 2003/0182938 A1 Oct. 2, 2003

(51) Int. Cl.[7] ................................................ F16D 31/02

(52) U.S. Cl. .............................. 60/422; 60/456; 60/468

(58) Field of Search .......................... 60/420, 422, 426, 60/456, 468

(56) References Cited

U.S. PATENT DOCUMENTS

| | | | |
|---|---|---|---|
| 3,916,767 A | 11/1975 | Barton | |
| 4,070,858 A | 1/1978 | Hand | |
| 4,189,919 A | 2/1980 | Goscenski, Jr. | |
| 4,343,151 A | 8/1982 | Lorimor | |
| 4,418,710 A | 12/1983 | Johnson | |
| 4,453,451 A | 6/1984 | Streeter et al. | |
| 4,487,255 A | 12/1984 | Bianchetta et al. | |
| 4,558,631 A | 12/1985 | Fassbender | |
| 4,663,936 A | 5/1987 | Morgan | |
| 4,709,666 A | 12/1987 | Merz | |
| 4,738,330 A | 4/1988 | Suzuki et al. | |
| 4,759,316 A | 7/1988 | Itakura | |
| 4,773,216 A | 9/1988 | Ohashi et al. | |
| 4,941,437 A | 7/1990 | Suzuki et al. | |
| 4,966,066 A | 10/1990 | Kauss et al. | |
| 5,095,691 A | 3/1992 | Yoshimura | |
| 5,315,829 A | 5/1994 | Fischer | |
| 5,678,469 A | 10/1997 | Lech | |
| 5,778,693 A | 7/1998 | Mientus | |
| 5,875,630 A | 3/1999 | Walsh et al. | |
| 5,950,431 A | 9/1999 | Oogushi | |
| 5,975,233 A | 11/1999 | Eisenbacher | |
| 6,016,657 A | 1/2000 | Buschur | |
| 6,076,488 A | 6/2000 | Yamagishi | |
| 6,142,110 A | 11/2000 | Bartley et al. | |
| 6,311,488 B1 * | 11/2001 | Maruta et al. | ................ 60/456 |

* cited by examiner

*Primary Examiner*—Edward K. Look
*Assistant Examiner*—Michael Leslie
(74) *Attorney, Agent, or Firm*—J. W. Burrows

(57) ABSTRACT

A fluid system having a common source of pressurized fluid is provided to selectively control the speed and/or pressure of a first hydraulic circuit while also providing flow/pressure priority to a second hydraulic circuit. The first hydraulic circuit includes a first electrically controlled proportional relief valve connected between the source of pressurized fluid and a first fluid actuator and a second electrically controlled proportional relief valve connected between the reservoir and a point downstream of the first electrically controlled proportional relief valve. The second hydraulic circuit is connected to the source of pressurized fluid in parallel with the first hydraulic circuit.

11 Claims, 3 Drawing Sheets

AUX

FLUID SYSTEM FOR TWO HYDRAULIC CIRCUITS HAVING A COMMON SOURCE OF PRESSURIZED FLUID

TECHNICAL FIELD

The subject invention relates generally to a fluid system with two hydraulic circuits having a common source of pressurized fluid and more particularly to a fluid system for the control of two hydraulic circuits that maintains priority to one of the circuits.

BACKGROUND

It is well known to provide a priority valve between a common source of pressurized fluid and the two separate circuits in order to provide priority to one of the circuits. However, in order to provide variable flow and pressure control to the other circuit while maintaining priority to the one circuit, added cost and complexity have been required. One example of such a system is set forth in U.S. Pat. No. 4,738,330 issued on Apr. 19, 1988 and assigned to Nippondenso Co., Ltd.

The present invention is directed to overcoming one or more of the problems as set forth above.

SUMMARY OF THE INVENTION

In one aspect of the present invention, a fluid system is provided for two hydraulic circuits having a common source of pressurized fluid. The fluid system includes a reservoir operatively connected to the source of pressurized fluid, a source of power drivingly connected to the source of pressurized fluid, and first and second hydraulic circuits connected in parallel to the common source of pressurized fluid. The first hydraulic circuit is connected to the source of pressurized fluid and the reservoir. The first hydraulic circuit includes a first fluid actuator connected between the source of pressurized fluid and the reservoir, a first electrically controlled proportional relief valve connected between the source of pressurized fluid and the fluid actuator, and a second electrically controlled proportional relief valve connected between the reservoir and a point between the first electrically controlled proportional relief valve and the fluid actuator. The second hydraulic circuit is connected in parallel to the source of pressurized fluid. The second hydraulic circuit includes a second fluid actuator connected to the source of pressurized fluid and a control valve operatively disposed between the source of pressurized fluid and the fluid actuator.

DETAILED DESCRIPTION

Figure 1:
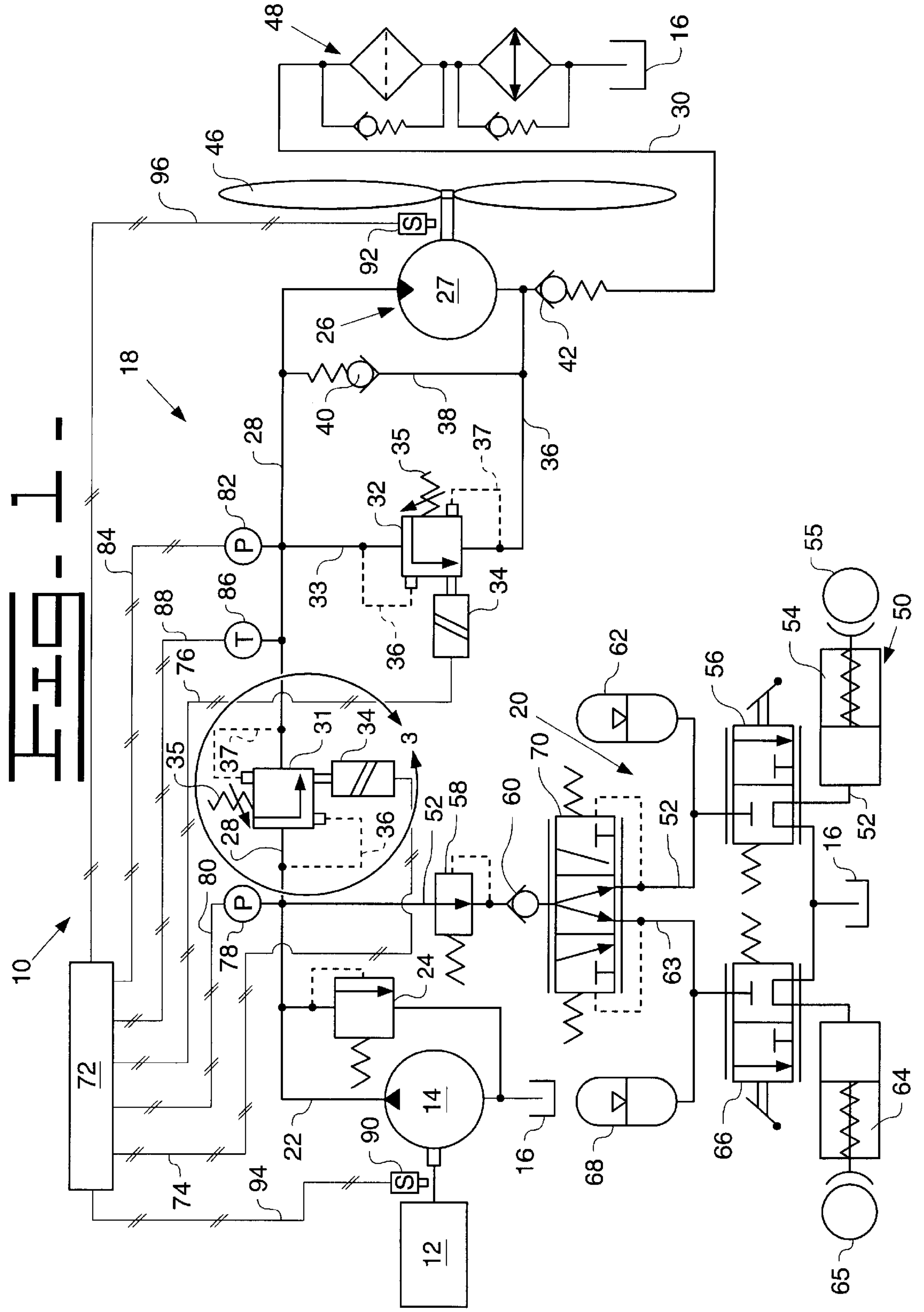
FIG. 1 is a schematic representation of a fluid system incorporating an embodiment of the present invention.

Referring to FIG. 1, a fluid system 10 is illustrated. The fluid system 10 includes a power source 12 drivingly connected to a source of pressurized fluid 14. The source of pressurized fluid 14 receives fluid from a reservoir 16 and delivers pressurized fluid to first and second hydraulic circuits 18,20 via a pressure conduit 22. A pressure relief valve 24 is operatively connected to the pressure conduit 22 to limit the maximum pressure of the source of pressurized fluid 14. It is recognized that in some systems, the pressure relief valve 24 may be eliminated without departing from the essence of the subject invention.

The first hydraulic circuit 18 includes a first fluid actuator 26 connected to the pressure conduit 22 via a conduit 28 and connected to the reservoir 16 via a conduit 30. The first fluid actuator of the subject embodiment is a fluid motor 27. A first electrically controlled proportional relief valve 31 (hereinafter referred to as ‘the first relief valve’) is disposed in the conduit 28 between the source of pressurized fluid 14 and the fluid motor 27. A second electrically controlled proportional relief valve 32 (hereinafter referred to as ‘the second relief valve’) is disposed in a conduit 33 connected between the conduit 28, downstream of the first relief valve 31, and the conduit 30, downstream of the fluid motor 27. The first and second relief valves 31,32 are operative in response to receipt of an electrical signal to change the relief pressure setting of the respective first and second relief valves 31,32 in proportion to the magnitude of the respective electrical signals. Each of the first and second relief valves 31,32 has an electrically controlled actuator 34, a spring 35, a first pilot signal conduit 36 connected at a point upstream thereof, and a second pilot signal conduit 37 connected downstream thereof. Pressure in the first pilot signal conduit 36 is operative to urge the respective relief valves 31,32 towards an open position and pressure in the second pilot conduit 37 is operative in cooperation with the spring 35 to urge the respective relief valves 31,32 towards the closed position. The electrically controlled actuator 34 is operative to urge the respective relief valves 31,32 towards an open position.

A conduit 38 having a one-way check valve 40 disposed therein is connected at one end thereof to the conduit 28 upstream of the fluid motor 27 and at the other end thereof to the conduit 30 downstream of the fluid motor 27. The one-way check valve 40 is operative to block fluid flow from the conduit 28 to the conduit 30 but permit fluid flow from the conduit 30 to the conduit 28. A low pressure restrictor valve 42 is disposed in the conduit 30 at a location downstream of the connection with the conduits 33,38 and operative to provide backpressure to the fluid motor 27 to help offset cavitation in the fluid motor 27.

In the subject embodiment, the first hydraulic circuit 18 is a fan drive circuit 44 and a cooling fan 46 is connected to the fluid motor 27 and operative in a known manner to cool a heat exchanger arrangement 48.

The second hydraulic circuit 20 includes a second fluid actuator 50 connected to the pressure conduit 22 by a conduit 52. The second fluid actuator 50 of the subject embodiment is a brake actuator cylinder 54 that functions to apply a braking force to a brake arrangement 55. A control valve 56 is disposed in the conduit 52 and operative to control the flow of pressurized fluid to the brake actuator cylinder 54. In the subject arrangement, a pressure reducing valve 58 is disposed in the conduit 52 downstream of the connection of the conduit 52 to the pressure conduit 22. It is recognized that the pressure reducing valve 58 could be eliminated without departing from the essence of the subject invention.

A one-way check valve 60 is disposed in the conduit 52 downstream of the pressure reducing valve 58 and is operative to permit flow from the pressure conduit 22 to the control valve 56 but block fluid flow in the reverse direction. An accumulator 62 is connected to the conduit 52 between the one-way check valve 60 and the control valve 56 and operative to store pressurized fluid therein in a conventional manner.

In the subject arrangement, the second hydraulic circuit 20 controls both front and rear braking action. Consequently, the second hydraulic circuit 20 of the subject embodiment includes a conduit 63 connecting another brake actuator cylinder 64 and associated brake arrangement 65, another control valve 66, and another accumulator 68 to the conduit 52 through a pressure/force balancing valve 70.

A controller 72 is disposed in the fluid system 10 and operatively connected to the first and second relief valves 31,32 by electrical lines 75,76. A first pressure sensor 78 is connected to the pressure conduit 22 and operative to deliver an electrical signal through an electrical line 80 to the controller 72 that is representative of the pressure in the pressure conduit 22. A second pressure sensor 82 is connected to the conduit 28 and operative to deliver an electrical signal through an electrical line 84 to the controller 72 that is representative of the pressure of the fluid being delivered to the first fluid actuator 26. A temperature sensor 86 is connected to the conduit 28 and operative to deliver an electrical signal to the controller 72 through an electrical line 88 that is representative of the temperature of the fluid being delivered to the first fluid actuator 26. First and second speed sensors 90,92 are respectively associated with the respective input of the source of pressurized fluid 14 and the output of the fluid motor 27 and operative through respective electrical lines 94,96 to deliver electrical signals to the controller 72 that are representative of the respective speeds of the source of pressurized fluid 14 and the fluid motor 27. It is understood that one or more of the sensors 78,82,90 and 92 could be eliminated without departing from the essence of the subject invention.

Figure 2:
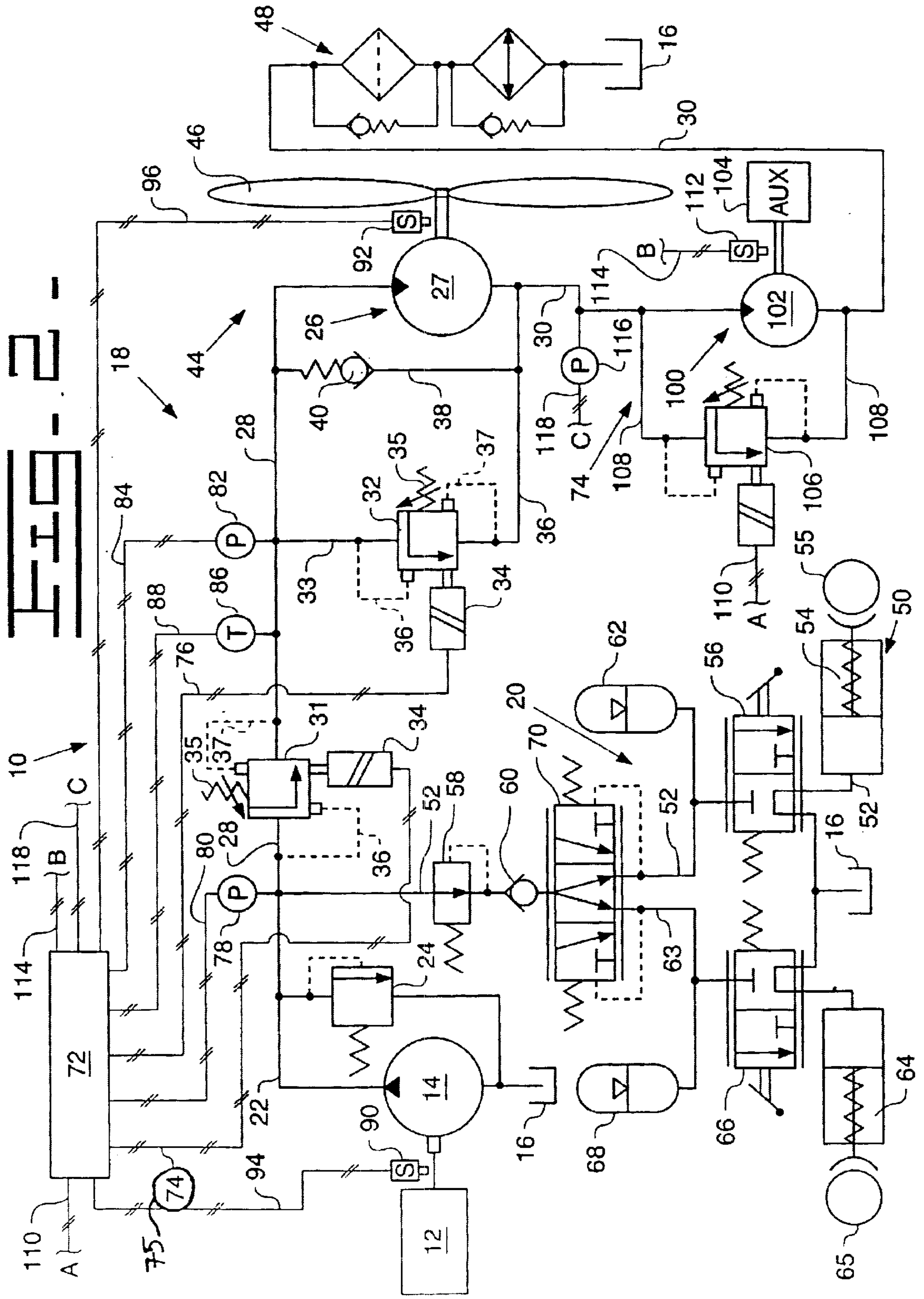
FIG. 2 is a schematic representation of a fluid system incorporating another embodiment of the present invention.

Referring to FIG. 2 another embodiment of the subject invention is disclosed. Like elements have like element numbers. The embodiment of FIG. 2 is very similar to that of FIG. 1. Only the differences between the embodiments will be described in detail. In FIG. 2, the low pressure restrictor valve 42 is removed and a third hydraulic circuit 74 is disposed in the conduit 30 downstream of the first fluid actuator 26. Consequently, the third hydraulic circuit 74 is in series with the first hydraulic circuit 18. The third hydraulic circuit 74 includes a third fluid actuator 100, which in the subject embodiment is a second fluid motor 102, drivingly connected to an auxiliary work system 104.

A third electrically controlled proportional relief valve 106 (hereinafter referred to as 'the third relief valve') is disposed in a conduit 108 that is connected at one end upstream of the second fluid motor 102 and at the other end downstream of the second fluid motor 102. The third relief valve 106 is electrically connected to the controller 72 through an electrical line 110. Furthermore, a third speed sensor 112 is associated with the output of the second fluid motor 102 and operatively connected to the controller 72 through an electrical line 114. A third pressure sensor 116 is connected to the conduit 30 upstream of the second fluid motor 102 and delivers a pressure signal through an electrical line 118 to the controller 72. It is recognized that the sensors 112 and 116 could be eliminated in some systems without departing from the essence of the subject invention.

Figure 3:
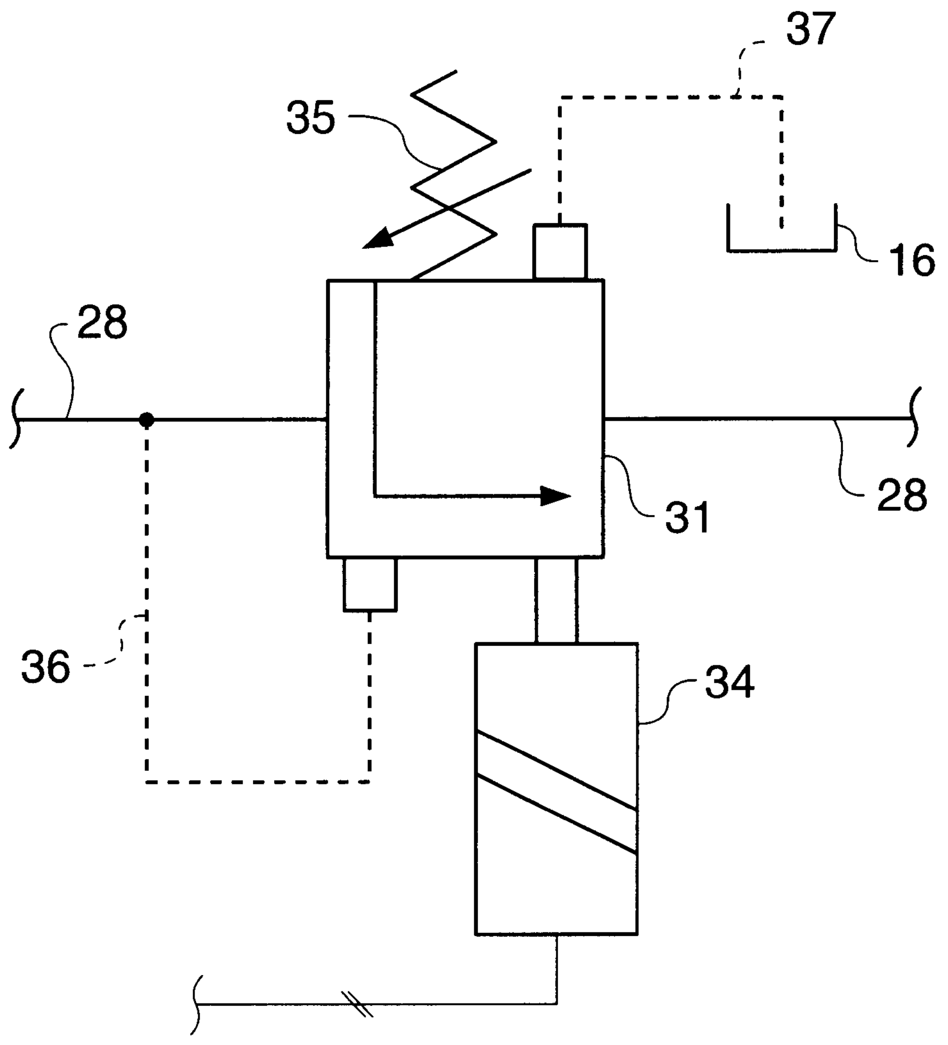
FIG. 3 is a partial view taken from FIG. 1 and/or FIG. 2 illustrating another schematic embodiment of a portion of the fluid system.

Referring to FIG. 3, another embodiment of the first relief valve 31 is illustrated. It is recognized that the embodiment of FIG. 3 could be used in place of any of the first, second, and/or third relief valves 31,32,106 without departing from the essence of the subject invention. In the embodiment of FIG. 3, the second pilot signal conduit 37 is connected to the reservoir 16. All other aspects are the same as described above. It is recognized that the second pilot conduit 37 could be connected to some other desirable reference pressure source.

It is also recognized that various other embodiments or modifications may be made without departing from the essence of the subject invention. For example, the control valve 56 and the another control valve 66 may each be controlled hydraulically, mechanically or electrically. Likewise, the auxiliary work system 104 could include more than one working device.

INDUSTRIAL APPLICABILITY

In the operation of the embodiment set forth in FIG. 1, pressurized fluid from the source of pressurized fluid 14 is available simultaneously to both of the first and second hydraulic circuits 18,20. The first relief valve 31 acts to ensure that a predetermined pressure level is maintained in the pressure conduit 22. This will ensure that the second hydraulic circuit 20 is always supplied with a volume of fluid at a predetermined pressure level. It is normally desirable to ensure that a minimum pressure level is always available for operation of the brakes in a machine. The accumulators 62,68 act to store a volume of pressurized fluid in a known manner to further ensure that amble pressurized fluid is always available for the brake arrangements 55,65. The pressure sensor 78 continuously monitors the pressure of the fluid in the pressure conduit 22 and delivers the signal to the controller 72.

The controller 72 controls the pressure relief setting of the first relief valve 31 thus controlling the pressure level in the pressure conduit 22. Any volume of fluid not being used in the second hydraulic circuit 20 is directed across the first relief valve 31 and through the conduit 28 to turn the fluid motor 27 thus turning the cooling fan 46. The resistance to rotation of the fluid motor 27 and cooling fan 46 pressurizes the fluid in the conduit 28. Increased speed of the cooling fan 46 results in the need for increased pressure of the fluid within the conduit 28. The speed of the cooling fan 46 continues to increase until the pressure in the conduit 28 nears the pressure of the fluid in the pressure conduit 22. There will always be a minimum pressure drop across the first relief valve 31. The maximum pressure of the fluid in the pressure conduit 22 is controlled by the pressure setting of the pressure relief valve 24.

In order to control the speed of the cooling fan 46, the controller 72 directs an electrical signal to the second relief valve 32 to change its pressure setting thus permitting fluid to be bypassed therethrough thus lowering the pressure level of the fluid in the conduit 28. As the pressure level in the conduit 28 decreases, the speed of the fluid motor 27 also decreases due to the turning resistance of the cooling fan 46. The speed sensor 92 continuously monitors the speed of the cooling fan 46 and delivers the signal to the controller 72.

Various system parameters, such as temperature, is also monitored by the controller 72 and the speed of the cooling fan 46 may be varied in response to changes in the temperature of the fluid within the fluid system 10. The controller 72 may also control the speed of the cooling fan 46 based on other system parameters. In the event that fluid in the conduit 28 is interrupted quickly, the cooling fan 46 may continue to free-wheel by exhaust fluid being directed through the conduit 38 and the one-way check valve 40 back to the conduit 28. This will continue until the cooling fan 46 stops turning or the flow interruption discontinues. The low pressure restrictor valve 42 acts to ensure that cavitation at the outlet of the fluid motor 27 is controlled.

In some systems, the operating pressure needed to turn the cooling fan 46 at its desired speed may cause the pressure in the pressure conduit 22 to exceed the pressured needed to operate the brake arrangements 56,66. In this event, the pressure reducing valve 58 is needed to limit the level of pressure being delivered to the second hydraulic circuit 20. Likewise, in some systems, the pressure relief valve 24 is eliminated by the first and second relief valves 31,32 being controlled by the controller 72 to control the maximum pressure level in the pressure conduit 22. Furthermore, by connecting the second pilot conduit 37 of one or more of the relief valves 31,32,106 to a different reference point as shown in FIG. 3, the logic and/or sensors required to control the regulated pressure upstream of the respective relief valves 31,32, 106 can be simplified.

When the braking demand is heavy, it may be necessary to reduce the speed of the cooling fan 46. This is accomplished by the pressure sensor 78 detecting a lower pressure level in the pressure conduit 22 and the controller 72 delivering a change in signal to the first relief valve 31 causing it to reduce the flow of fluid thereacross. Once the heavy braking action has terminated, the first relief valve 31 is returned to its initial pressure setting.

Referring to the operation of FIG. 2, the operation of the first and second hydraulic circuits 18,20 remains the same. The only difference of the operation of the embodiment of FIG. 2 is that of the third hydraulic circuit 74. The exhaust fluid from the fluid motor 27 is the driving fluid for the second fluid motor 102. Since the third hydraulic circuit 74 is connected in series with the fluid motor 27, the operating pressures of both the first and third hydraulic circuits 18,74 are additive. Thus the pressure of the fluid in the conduit 28 is equal to the sum of the operating pressures of both of the fluid motors 27,102. In order to control the speed of the second fluid motor 102, the controller 72 delivers an electrical signal through the electrical line 110 to the third relief valve 106 to change its pressure setting thus allowing fluid to be bypassed from the conduit 30 upstream of the second fluid motor 102 to a location downstream thereof. Consequently, the speed of the second fluid motor 102 and thus the speed of the auxiliary work system 104 is varied in proportion to the electrical signal from the controller 72.

In view of the foregoing, it is readily apparent that the subject fluid system 10 is simple in construction, thus non-complex, and is very cost effective since only a small number of components are required to maintain priority to one hydraulic circuit 20 while maintaining the ability to precisely control another hydraulic circuit 18.

Other aspects, objects and advantages of this invention can be obtained from a study of the drawings, disclosure and appended claims.

What is claimed is:

1. A fluid system for two hydraulic circuits having a common source of pressurized fluid, the fluid system comprising:

a reservoir operatively connected to the source of pressurized fluid;

a source of power drivingly connected to the source of pressurized fluid;

a first hydraulic circuit connected to the source of pressurized fluid and the reservoir, the first hydraulic circuit includes a first fluid actuator connected between the source of pressurized fluid and the reservoir, a first electrically controlled proportional relief valve connected between the source of pressurized fluid and the fluid actuator, and a second electrically controlled proportional relief valve connected between the reservoir and a point between the first electrically controlled proportional relief valve and the fluid actuator;

a second hydraulic circuit connected in parallel to the source of pressurized fluid, the second hydraulic circuit includes a second fluid actuator connected to the source of pressurized fluid and a control valve operatively disposed between the source of pressurized fluid and the fluid actuator.

2. The fluid system of claim 1 including a controller operatively connected to each of the first and second electrically controlled proportional relief valves.

3. The fluid system of claim 2 including a pressure reducing valve connected between the source of pressurized fluid and the second hydraulic circuit.

4. The fluid system of claim 2 including a first pressure sensor connected between the controller and the first and second hydraulic circuits and a second pressure sensor connected between the controller at a location between the first electrically controlled proportional relief valve and the first fluid actuator, the first pressure sensor being operative to deliver a signal to the controller representative of the operating pressure of the source of pressurized fluid and the second pressure sensor being operative to deliver a signal to the controller representative of the operating pressure of the fluid being delivered to the first fluid actuator.

5. The fluid system of claim 4 wherein the first fluid actuator is a fluid motor and the fluid system includes a speed sensor associated with the fluid motor, the speed sensor being operative to deliver a signal to the controller representative of the speed of the fluid motor.

6. The fluid system of claim 5 including a cooling fan, the first hydraulic circuit is a fan drive circuit and the first fluid motor is drivingly connected to the cooling fan.

7. The fluid system of claim 6 including a brake arrangement, the second hydraulic circuit is a brake circuit and the second fluid actuator is a brake actuator connected to the brake arrangement.

8. The fluid system of claim 7 including a temperature sensor connected between the controller and a location downstream of the fluid motor and operative to deliver a signal to the controller representative of the temperature of the fluid being delivered to the fluid motor.

9. The fluid system of claim 1 including a third hydraulic circuit disposed between the first fluid actuator and the reservoir.

10. The fluid system of claim 9 wherein the third hydraulic circuit includes a third fluid actuator and a third electrically controlled proportional relief valve connected between the reservoir and a point upstream of the third fluid actuator.

11. The fluid system of claim 10 wherein the controller is connected to the third electrically controlled proportional relief valve and operative to control the third electrically controlled proportional relief valve.

* * * * *